US009206069B2

(12) United States Patent
Pulz et al.

(10) Patent No.: US 9,206,069 B2
(45) Date of Patent: Dec. 8, 2015

(54) APPARATUS AND METHOD FOR CONVEYING A GLASS TUBE STRAND OR GLASS ROD STRAND HAVING A CROSS-SECTION DIFFERENT FROM A CIRCULAR CROSS-SECTION

(71) Applicant: Schott AG, Mainz (DE)

(72) Inventors: Wolfgang Pulz, Mittereich (DE); Walter Fachtan, Themenreuth (DE); Juergen Duernhofer, Wiesau (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/251,929

(22) Filed: Apr. 14, 2014

(65) Prior Publication Data

US 2014/0305169 A1    Oct. 16, 2014

(30) Foreign Application Priority Data

Apr. 12, 2013 (DE) .......................... 10 2013 103 687

(51) Int. Cl.
*C03B 37/03* (2006.01)
*C03B 35/26* (2006.01)
*C03B 23/043* (2006.01)
*C03B 23/045* (2006.01)

(52) U.S. Cl.
CPC .............. *C03B 37/03* (2013.01); *C03B 23/043* (2013.01); *C03B 23/045* (2013.01); *C03B 35/26* (2013.01); *C03B 2207/42* (2013.01); *Y10T 29/49998* (2015.01)

(58) Field of Classification Search
USPC ............ 65/437, 377, 381, 475, 484, 486, 500
See application file for complete search history.

(56) References Cited

U.S. PATENT DOCUMENTS 4,312,659 A * 1/1982 Panarello et al. ................. 65/84
4,546,811 A * 10/1985 Potard .......................... 164/66.1
4,636,239 A * 1/1987 Wilson et al. ................... 65/109

(Continued)

FOREIGN PATENT DOCUMENTS

DE          10113344 A1    10/2002
JP          2005015278 A    1/2005
JP          2008265913 A   11/2008

OTHER PUBLICATIONS

European Search Report for corresponding EP 14158176.9, dated Aug. 8, 2014, with English translation, 9 pp.

(Continued)

*Primary Examiner* — Mark Halpern
(74) *Attorney, Agent, or Firm* — Ohlandt, Greeley, Ruggiero & Perle, LLP

(57) ABSTRACT

In an apparatus for conveying a glass tube strand or glass rod strand having a cross-section that is different from a circular cross-section, in particular having an oval cross-section, a plurality of support and guide members are arranged, if viewed in the direction of movement of the glass tube strand or glass rod strand, one after the other such that the moving glass tube strand or glass rod strand is directly supported thereon and guided by them. The support and guide members are disposed tilted in said direction of movement so that the moving glass tube strand or glass rod strand is directly supported on edges of the support and guide members. Thus, one-sided heat losses due to heat dissipation via the support and guide members can be significantly reduced to thereby reduce the curvature of the glass tube strand or glass rod strand.

16 Claims, 10 Drawing Sheets

(56) References Cited

U.S. PATENT DOCUMENTS

| | | | |
|---|---|---|---|
| 5,683,482 A | | 11/1997 | Fredholm |
| 5,688,300 A | * | 11/1997 | Ashley et al. ............ 65/86 |
| 5,766,298 A | * | 6/1998 | Ashley et al. ............ 65/187 |
| 2002/0184922 A1 | * | 12/2002 | Dick et al. ............ 65/182.2 |

OTHER PUBLICATIONS

Schunk Group, "Characteristic Data Standard Materials", 2011.

* cited by examiner

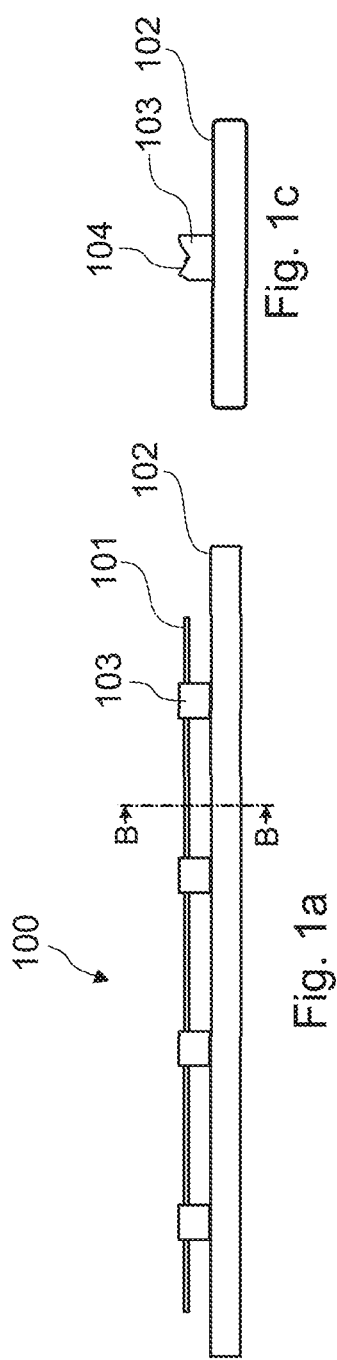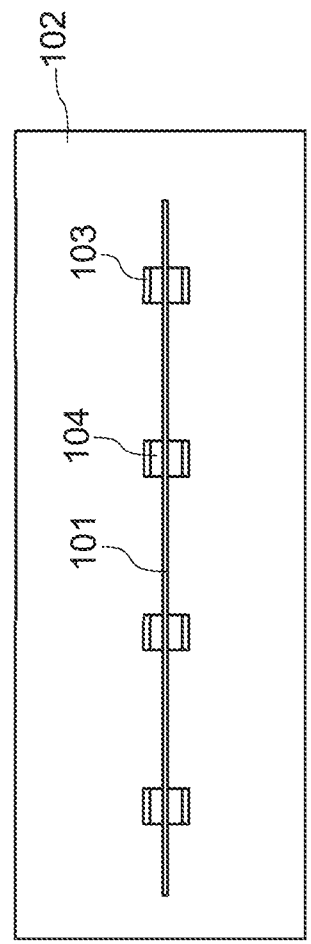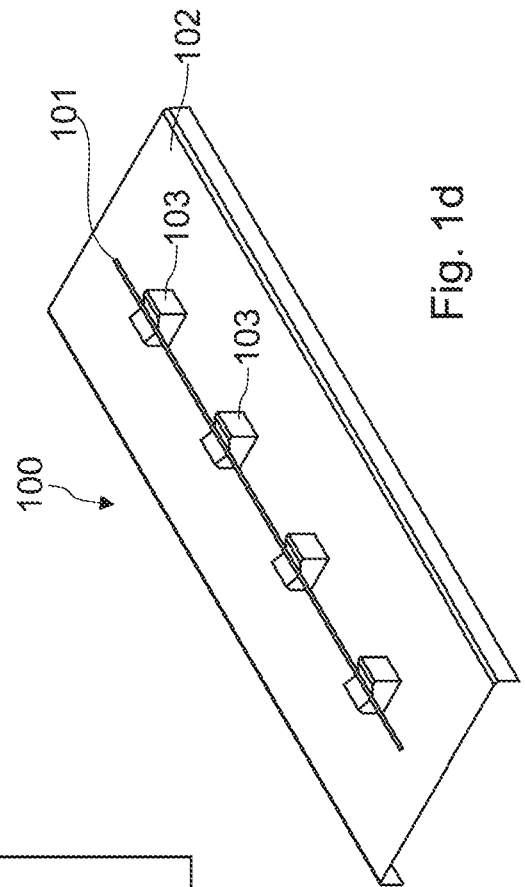

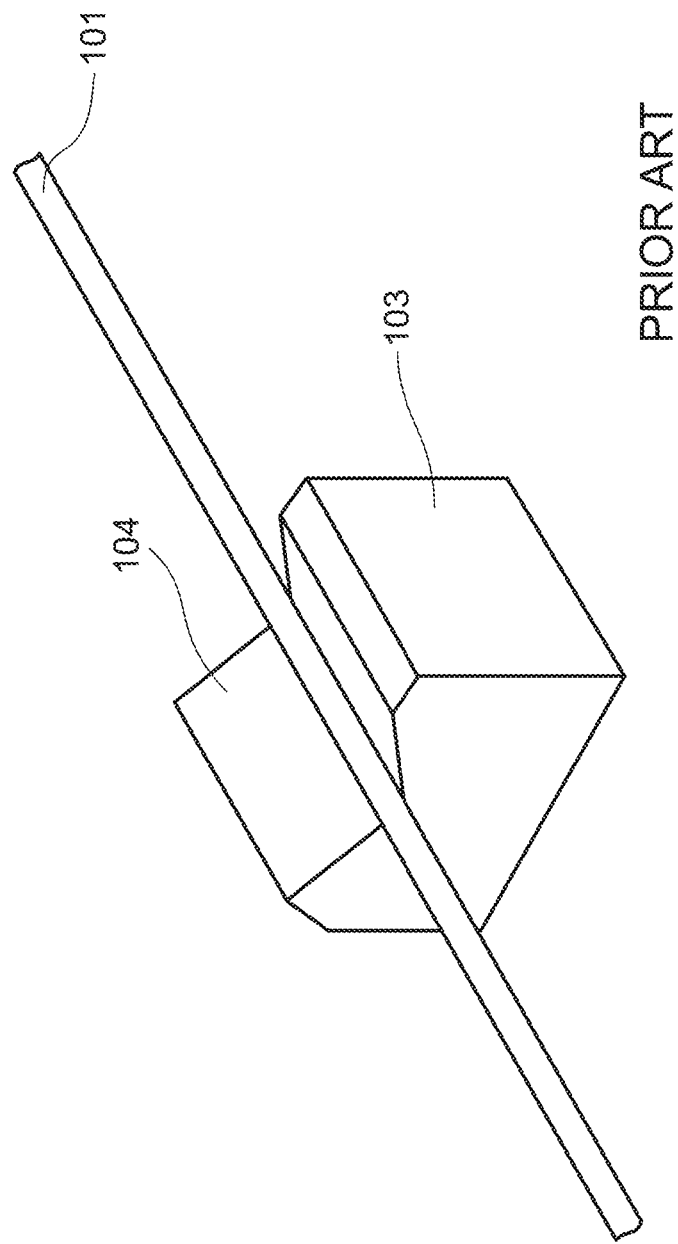

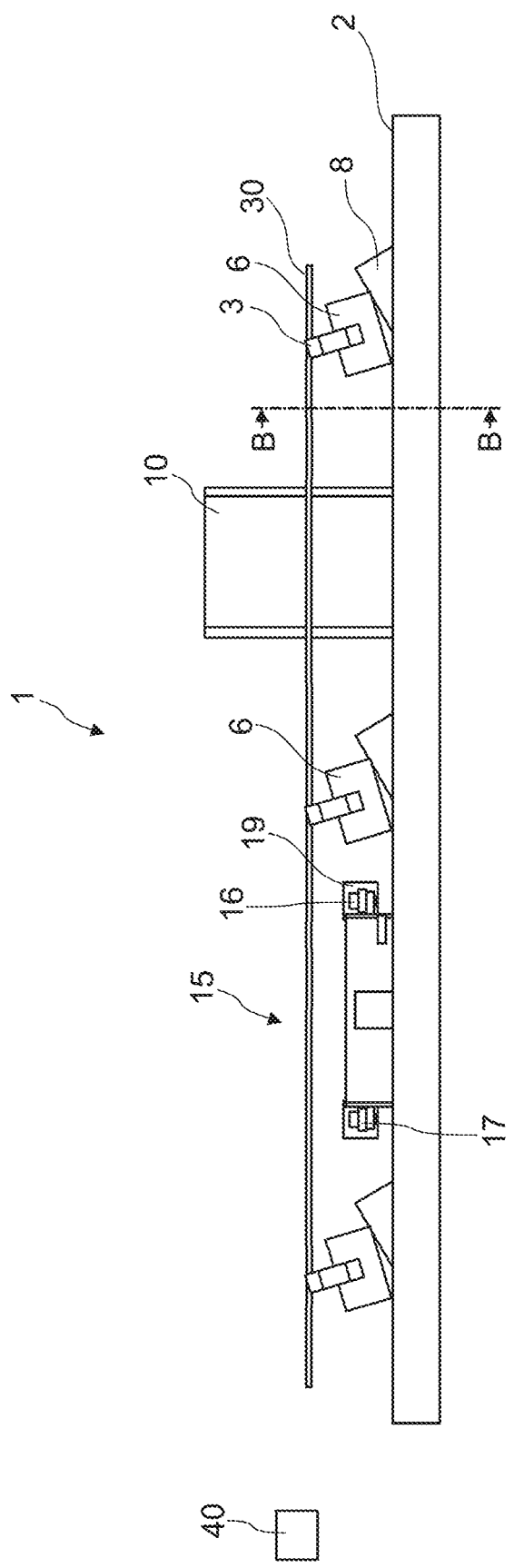

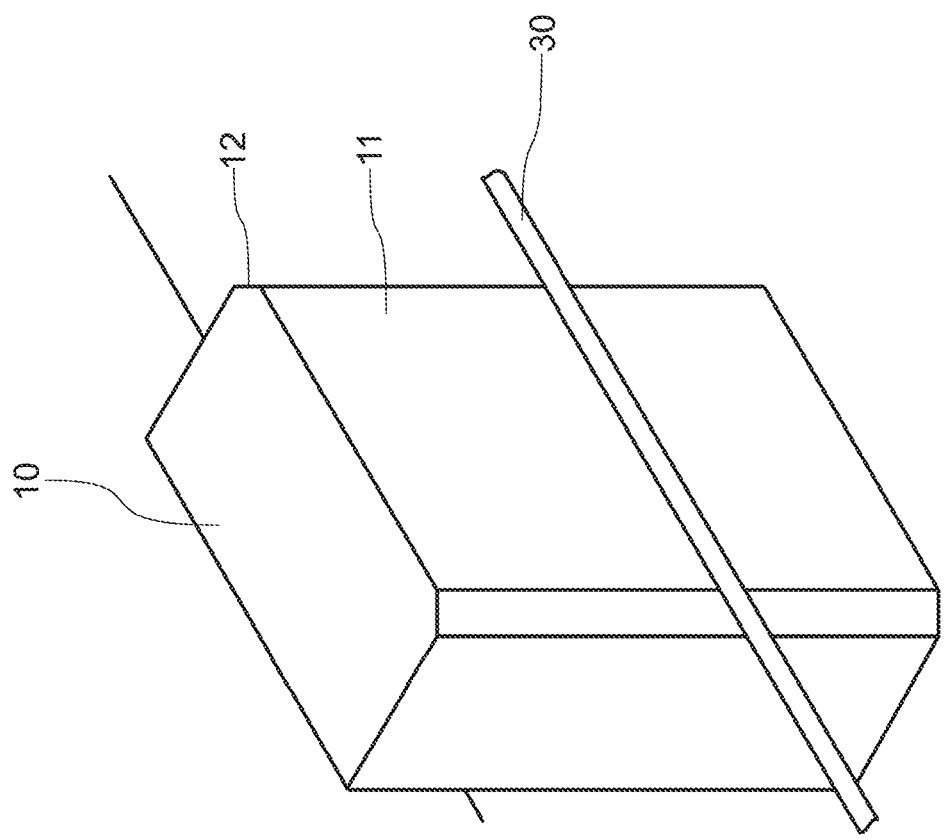

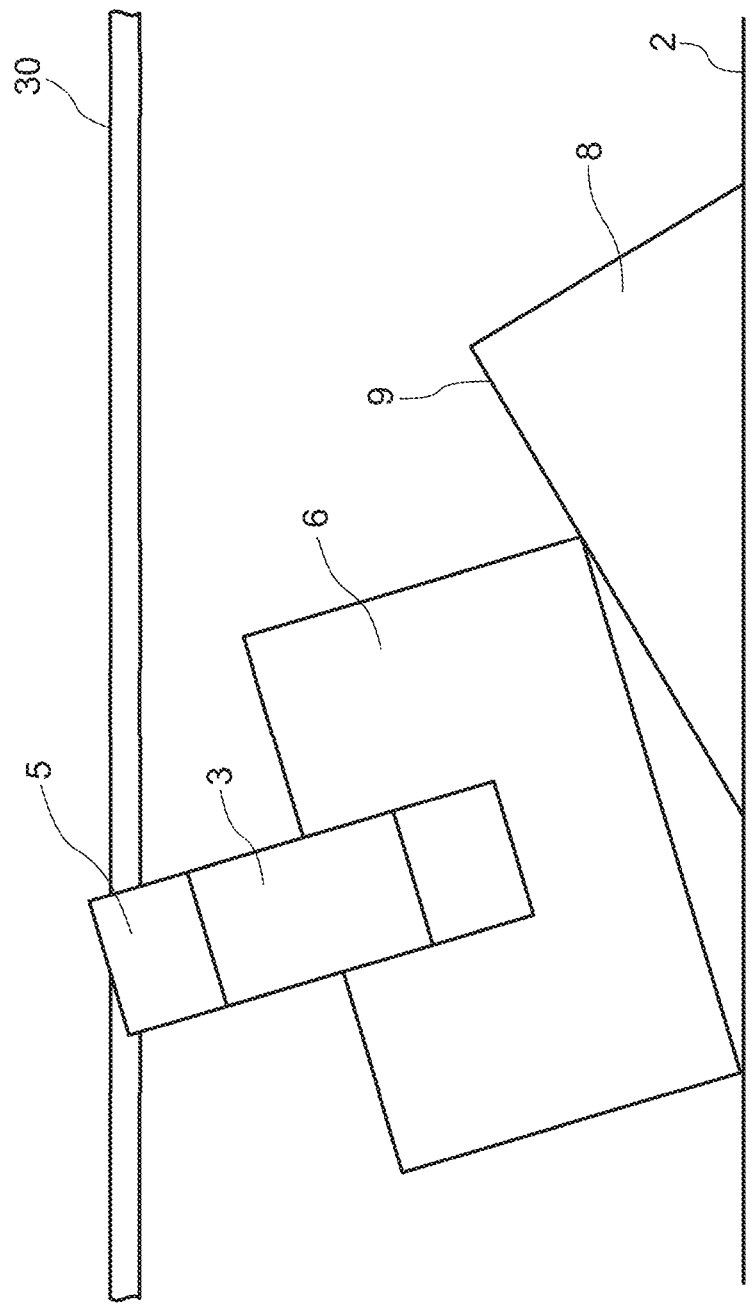

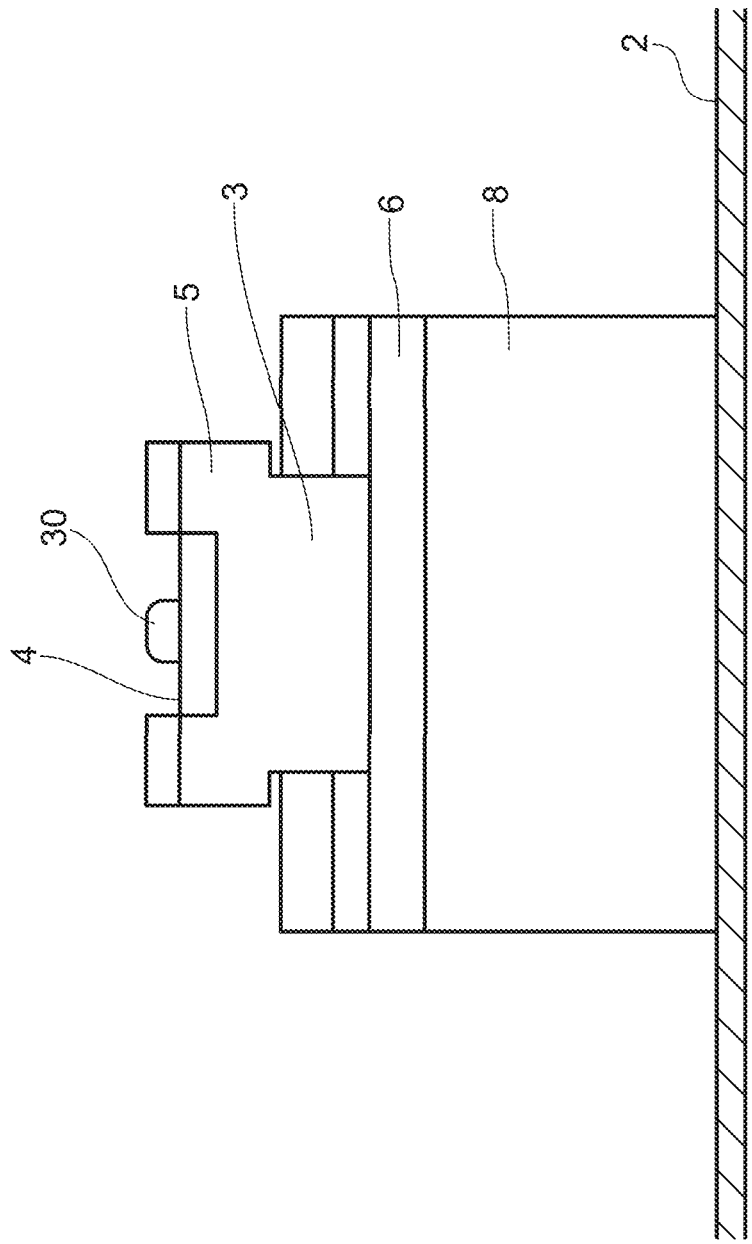

APPARATUS AND METHOD FOR CONVEYING A GLASS TUBE STRAND OR GLASS ROD STRAND HAVING A CROSS-SECTION DIFFERENT FROM A CIRCULAR CROSS-SECTION

The present application claims the benefit under 35 U.S.C. §119(a) of German Patent Application No. 10 2013 103 687.2, "Apparatus and method for conveying a glass tube strand or glass rod strand having a cross-section different from a circular cross-section as well as use thereof", filed on 12 Apr. 2013, the entire contents of which is hereby incorporated by way of reference.

FIELD OF INVENTION

The present invention relates generally to an apparatus and a method for conveying a glass tube strand or glass rod strand, and relates in particular to an apparatus and a method for conveying a glass tube strand or glass rod strand having a cross-section that is different from a circular cross-section, particularly an oval glass tube strand or glass rod strand, as well as uses thereof.

BACKGROUND OF INVENTION

FIGS. 1a-1d show a conventional apparatus 100 for conveying a glass tube strand or glass rod strand 101 having a circular cross-section. A plurality of support and guide members 103 made of graphite are disposed one after the other, if viewed in the direction of movement of the glass tube strand or glass rod strand 101, on a base plate 102, which may e.g. also be embodied as a machine frame. According to the sectional view of FIG. 1c and the perspective view of FIG. 1e, a V-shaped notch 104 may be provided on the upper side of the support and guide members 103. The moving glass tube strand or glass rod strand 101 is directly supported at the bottom of the V-shaped notch 104, and is guided in this manner.

For reducing the curvature of the glass tube strand or glass rod strand 101, i.e. the deviation of the glass tube strand or glass rod strand 101 from a straight line in the direction of movement of the glass tube strand or glass rod strand 101, it is conveyed such that it rotates continuously about its longitudinal axis. This can be accomplished for example by means of two pulling chains, which are covered with plates that engage the outer circumference of the glass tube strand or glass rod strand 101 and thus take it with them. If these pulling chains are not adjusted exactly in parallel with each other, a uniform rotation of the glass tube strand or glass rod strand 101 can be achieved during the conveyance along the drawing path.

Furthermore, one or more gas burners may be arranged along the drawing path, which heat the moving glass tube strand or glass rod strand 101 up to temperatures about the transition temperature of the respective type of glass used in order to further enhance the curvature of the glass tube strand or glass rod strand 101. For this purpose relatively large and wide gas burners are used that conventionally heat the entire cross-section of the glass tube.

This approach does not always enable a desired reduction in curvature of glass tube strands or glass rod strands. In particular, this approach is not suitable for conveying glass tube strands or glass rod strands having a cross-section that is different from a circular cross-section, in particular having an oval cross-section. Thus, there is need for further improvements.

SUMMARY OF INVENTION

It is an object of the present invention to provide an apparatus and a method for conveying a glass tube strand or glass rod strand having a cross-section that is different from a circular cross-section, whereby the above-mentioned shortcomings can be at least alleviated. In particular, the curvature of the glass tube strand or glass rod strand shall be reduced as much as possible.

According to a first aspect, the present invention relates to an apparatus for conveying a glass tube strand or glass rod strand having a cross-section that is different from a circular cross-section, in particular having an oval cross-section, said apparatus comprising a plurality of support and guide members that are arranged, if viewed in the direction of movement of the glass tube strand or glass rod strand, one after the other in such a manner that the moving glass tube strand or glass rod strand is directly supported thereon and guided by them. According to the present invention the support and guide members are disposed tilted in said direction of movement so that the moving glass tube strand or glass rod strand is directly supported on edges of the support and guide members.

It has been found that, by means of this surprisingly simple measure, a main cause for the curvature of a glass tube strand or glass rod strand according to the prior art can be eliminated, namely too high temperature differences between the bottom or supporting surface of the glass tube strand or glass rod strand and non-contact surfaces of the glass tube strand or glass rod strand, i.e. portions of the glass tube or glass rod strand opposite or adjacent to the supporting surface. Elaborate series of experiments of the inventors have shown that the support of the glass tube strand or glass rod strand on the support and guide members conventionally results in significant unilateral temperature losses that result in a significant curvature or distortion of the glass tube strand or glass rod strand.

By tilting of the support and guide members, the contact area to the glass tube strand or glass rod strand can be substantially reduced, and hence the dissipation of heat via the contact area can be reduced significantly.

This advantageous effect is more significant if the glass tube strand or glass rod strand is still at a temperature above the transition temperature of the respective type of glass used, since processing and handling errors in this temperature range would otherwise prevail over the entire handling chain in the processing of glass tubes or glass rods. Elaborate series of experiments by the inventors have in particular shown that a desired reduction in the curvature of glass tubes can be accomplished by means of the apparatus according to the present invention even without a large-scale reheating of the glass tube strand or glass rod strand, particularly without wide gas burners or wide rows of gas burners with large flame size that practically reheat the entire outer circumference (over 360°) of the glass tube strand or glass rod strand. Series of experiments by the inventors have in particular shown that in the conventional approach with a large-scale reheating of the glass tube strand or glass rod strand the temperature differences will be substantially maintained despite a large-scale heating because of the relatively poor thermal conductivity of glass. This would not be efficient to further reduce the curvature of the glass tube strand or glass rod strand.

In order to reduce the heat dissipation via the support and guide members even further, according to a further embodiment these can respectively be held in a non-metallic insulating block of a material having a poor thermal conductivity. This block can be made for example of a ceramic having a poor thermal conductivity.

In order to reduce the heat dissipation via the support and guide members even further, according to a further embodiment these can be respectively clamped in a groove of the associated insulating block, which can be achieved in particular by means clamping or press-fitting. The insulating block can be held positively (i.e. in a positive-fit manner) or frictionally in the groove or receptacle of the respective support and guide member.

According to a further embodiment, the apparatus comprises at least one adjusting unit for adjusting the tilt angle about which the support and guide members are tilted in the direction of movement. This is not to specifically exclude a tilting and displacement in other directions. In any case a component of the adjusting movement of the support and guide member shall also be present in the direction of movement of the glass tube strand or glass rod strand.

The adjustment can be performed for all support and guide members in a coordinated manner. However, according to a further embodiment, the adjustment is performed separately for each support and guide member by means of respective positioning units. Because of the high temperatures prevailing in the region of the support and guide members, however, adjustment as simple as possible is preferred. Preferably, the aforementioned adjustment is configured such that the support points of the moving glass tube strand or glass rod strand take the same height level or predetermined height levels on the support and guide members in order to further reduce the curvature of the glass tube strand or glass rod strand.

According to a further embodiment such an adjustment can be implemented in that the respective adjustment unit comprises an adjusting wedge having an inclined surface on which the associated support and guide member or an insulating block, which holds said associated support and guide member, is directly supported, wherein said tilt angle can be adjusted by displacing the associated support and guide member or the insulating block, which holds said associated support and guide member, along the inclined surface. If an appropriate tilt angle and/or a suitable position of the support and guide member is found, the so-selected position of the support and guide member or of the insulating block, which holds said associated support and guide member, can be fixed, for example by means of simple clamping or screwing.

According to a further embodiment, the support and guide members respectively comprise at least one supporting surface which is delimited laterally by two side walls projecting symmetrically therefrom so that a support and guide groove is formed that has a substantially rectangular cross-section. By this simple measure, the respective supporting surface can be minimized in the region of the respective support and guide member. The side walls retain the heat in the support and guide groove and prevent excessive heat losses by thermal radiation. Furthermore, because of the symmetrical design of the support and guide groove overall a relatively uniform temperature profile can be obtained, which advantageously contributes to a further reduction of the curvature of the glass tube strand or glass rod strand.

According to a further embodiment the apparatus further comprises a heating zone to selectively heat the glass tube strand or glass rod strand locally, wherein the heating zone comprises at least one gas burner which is configured and operated such that it heats the glass tube strand or glass rod strand substantially only from one side thereof. This gas burner is located on the side of the supporting surface of the glass tube strand or glass rod strand on the respective support and guide member, so that heat losses of the glass tube strand or glass rod strand due to the contact with the support and guide member can be compensated in a simple manner without the necessity of reheating the entire outer circumference of the glass tube strand or glass rod strand for this purpose. Advantageously, the gas burner is thus disposed below the moving glass tube strand or glass rod strand.

Preferably, the respective gas burner produces a relatively narrow combustion flame of a few centimeters in length, which heats the glass tube strand or glass rod strand on one side only and not over the entire outer circumference.

According to a further embodiment, the distance and/or the position of the gas burner relative to the moving glass tube strand or glass rod strand can be varied, so that the glass tube strand or glass rod strand can be heated locally and more precisely.

To further reduce the curvature of the glass tube strand or glass rod strand, according to a further embodiment the apparatus further comprises at least one contact member that abuts the moving glass tube strand or glass rod strand laterally for further reducing its curvature. Such a contact member may be oriented substantially perpendicular to the base plate of the apparatus and reduces or even prevents a lateral curvature of the glass tube strand or glass rod strand. Depending on the curvature of the glass tube strand or glass rod strand, which is actually measured or which can be expected under normal operation conditions of the apparatus, also several such contact members may be arranged laterally of the glass tube strand or glass rod strand, for example on the left-hand side or right-hand side of the glass tube strand or glass rod strand.

According to a further embodiment the apparatus further comprises a measuring device for measuring the curvature of the glass tube strand or glass rod strand during the production process, i.e. during the production of the glass tube strand or glass rod strand. The measurement can be carried out on the still moving glass tube strand or glass rod strand and in a still heated state, or alternatively be carried out even after severing glass tubes or glass rods of a desired length. The apparatus may further comprise a central control unit for varying positions and/or operating parameters of components of the apparatus such that the curvature of the glass tube strand or glass rod strand is reduced or minimized. The afore-mentioned position can be in particular the position of the respective support and guide member and of the holding members respectively holding them relative to the glass tube strand or glass rod strand, or the respective tilting of the respective support and guide member.

The aforementioned operating parameter may be in particular the amount of combustion or the composition of the combustion gas of said at least one gas burner or the speed of withdrawal of the glass tube strand or glass rod strand.

According to a further aspect of the present invention, there is provided a corresponding method for conveying a glass tube strand or glass rod strand having a cross-section that is different from a circular cross-section, in particular having an oval cross-section, particularly by using an apparatus as outlined above. In the method, the moving glass tube strand or glass rod strand is supported directly on and guided by a plurality of support and guide members that are arranged one after the other, if viewed in the direction of movement of the glass tube strand or glass rod strand. According to the present invention the support and guide members are disposed tilted in the direction of movement and the moving glass tube strand or glass rod strand is directly supported on edges of the support and guide members, as outlined above.

According to a further embodiment there is provided a measuring device, which measures the curvature of the glass tube strand or glass rod strand, and a central control unit that varies positions and/or operating parameters of components of the apparatus such that the curvature of the glass tube strand or glass rod strand is reduced or minimized.

A further aspect of the present invention relates to the use of the apparatus as described above or of the method as described above for conveying a glass tube strand or glass rod strand having a cross-section that is different from a circular cross-section, in particular having an oval cross-section.

OVERVIEW ON DRAWINGS

Hereinafter, the invention will be described by way of example and with reference to the accompanying drawings, from which further features, advantages and problems to be solved will become apparent. In the drawings:

FIGS. 1a-1e show a glass tube drawing path according to the prior art and details thereof;

FIGS. 2a-2e show the guiding and supporting of a glass tube according to the present invention; and FIGS. 3a-3c show a glass tube drawing path according to the present invention as well as details thereof.

In the drawings, identical reference numerals designate identical or functionally equivalent members or groups of members.

DETAILED DESCRIPTION OF EMBODIMENTS

Figure 2A:
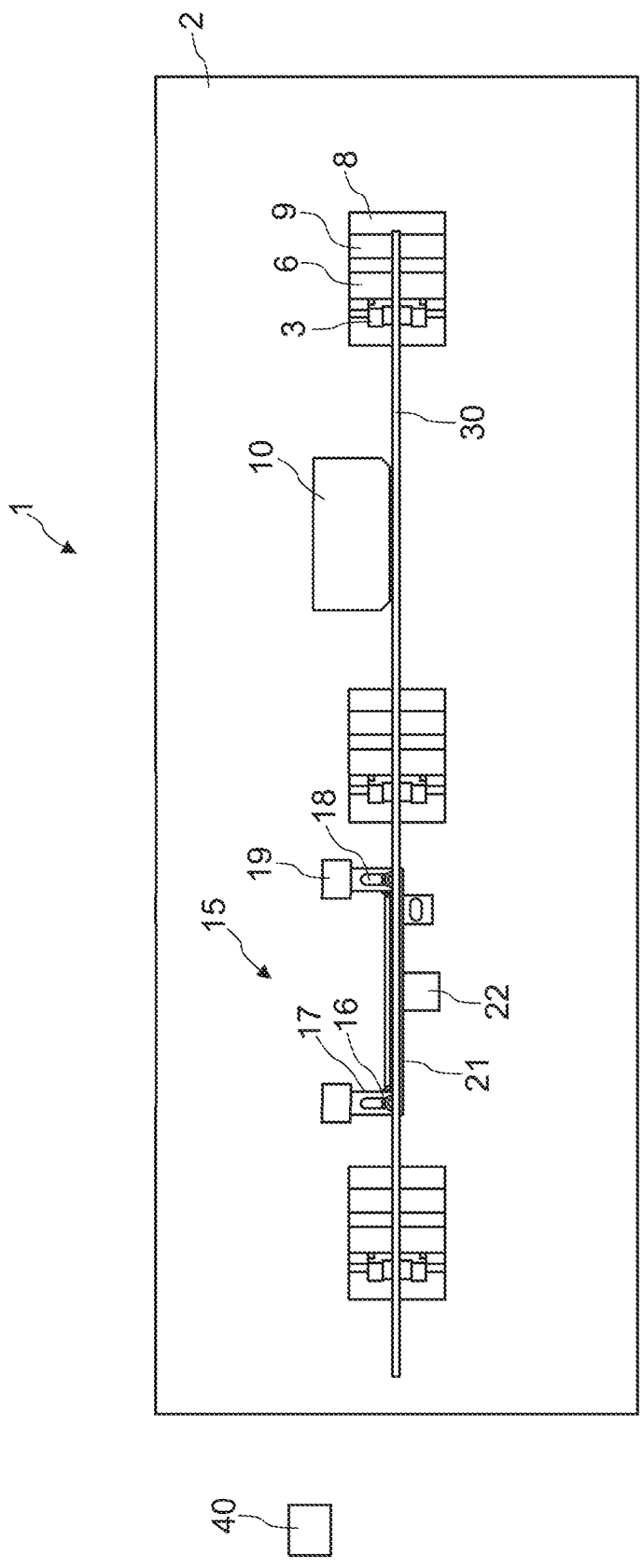

In the following, an apparatus 1 for conveying a glass tube strand or glass rod strand 30 having a cross-section that is different from a circular cross-section will be described with reference to FIGS. 2a-2e. A plurality of support and guide members 3 of graphite or a similar high temperature resistant and abrasion-resistant material is disposed on a base plate 2, e.g. on a machine frame, one after the other, if viewed in the direction of movement of the glass tube strand or glass rod strand 30. These support and guide members 3 are shown on an enlarged scale and in a perspective view in FIG. 3a. They have a substantially square-shaped basic shape, wherein recessed supporting surfaces 4 are formed on the side edges, which are embraced symmetrically by two side walls 5 that project substantially perpendicularly from the supporting surfaces 4, so that a groove is formed between the side walls 5 having a substantially rectangular cross-section. The support and guide member 3 of such a shape is respectively tilted in the direction of movement (or longitudinal direction) of the glass tube strand or glass rod strand 30 by an acute angle, for example, in the range from 5° to 35°, preferably in the range from 7.5° to 20°, and more preferably in the range from 10° to 15°.

The moving glass tube strand or glass rod strand 30 is supported on an edge of the support and guide member 3, hence in a relatively short zone, but not over the entire length of the rectangular notch formed by the side walls 5. In this way, one-sided heat losses of the glass tube strand or glass rod strand 30 due to conduction of heat via the support and guide member 3 can be significantly reduced. The lateral guidance of the glass tube strand or glass rod strand 30 can be accomplished by means of additional lateral bearing members, for example, by means of a contact member designated by reference numeral 10. To a lesser extent, however, also groove-shaped abrasion traces on the edges of the support and guide members 3 can contribute for this purpose.

Figure 3A:
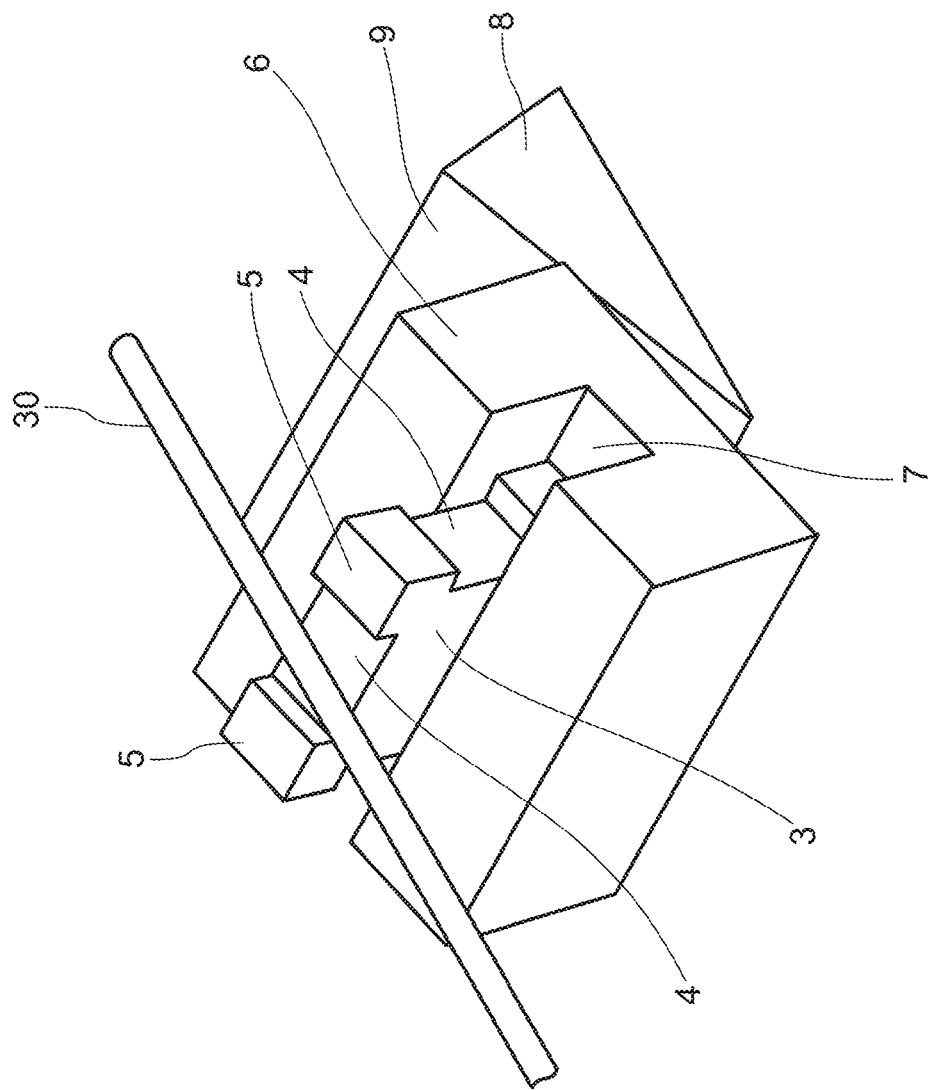

Because the four sides of the support and guide member 3 according to FIG. 3a have an identical shape, in the event of excessive wear (by abrasion or the like) the support and guide member 3 only needs to be turned by an angle of 90° or an integer multiple thereof in order to implement identical support and guide conditions.

As shown in FIG. 3a, the support and guide member 3 is held in a rectangular groove 7 of a holding member 6, which consists of a material having a poor heat conductivity, such as a high temperature resistant ceramics material having a poor heat conductivity. Thus, one-sided heat losses of the moving glass tube strand or glass rod strand 30 can be reduced even further. The support and guide member 3 is clamped in the groove 7 by means of screws, not shown, but may also be positively or frictionally fixed in the groove 7.

Referring to FIG. 3a, the support member 6 generally is rectangular-shaped and its rear edge rests on the upper inclined surface 9 of a wedge 8, which is fixed in a suitable manner on the base plate 2 as shown in FIG. 2a, for example on a frame of the apparatus 1. As can be seen in the side view of FIG. 3b, the tilt angle of the support and guide member 3 can be adjusted by displacing the support member 6 along the inclined surface 8 of the wedge 8. At the same time, thus the height position of the support point of the glass tube strand or glass rod strand 30 with respect to the base plate 2 (see FIG. 2) can be precisely adjusted so that all the support points of the plurality of support and guide members 3 of the apparatus 1 are disposed in alignment with each other and at the same height with respect to the base plate 2 so that a curvature of the glass tube strand or glass rod strand 30 that is induced by different heights of the support points can be avoided.

By means of the plurality of support and guide members 3 the yet hot glass tube strand or glass rod strand 30 is guided along the drawing path of the apparatus 1. The glass tube strand or glass rod strand 30 is driven by drive rollers or drive chains not shown.

The glass tube strand or glass rod strand 30 has a cross-section different from a circular cross-section, i.e. has a broadside (in particular transversely to the direction of movement of the glass tube strand or glass rod strand 30 and in parallel with the upper surface of the base plate 2) and a narrow side (in particular transversely to the direction of movement of the glass tube strand or glass rod the strand 30 and perpendicular to the upper surface of the base plate 2, i.e. perpendicular to the above-mentioned broadside). A particularly stable and reliable guidance can be accomplished if the glass tube strand or glass rod strand 30 is supported with the aforementioned broadside on the edges of the support and guide members 3 and is guided by them. The glass tube strand or glass rod strand 30, such as an oval tube, does not rotate about its longitudinal axis during conveyance along the drawing path.

While the curvature of the glass tube strand or glass rod the strand 30 in this orientation perpendicularly to the base plate 2 can be reduced or minimized by means of the afore-mentioned height-positioning of the support and guide members 3 and of their supporting surfaces with respect to the base plate 2 and in alignment, the curvature in the direction perpendicular is reduced or minimized as follows.

Figure 2B:
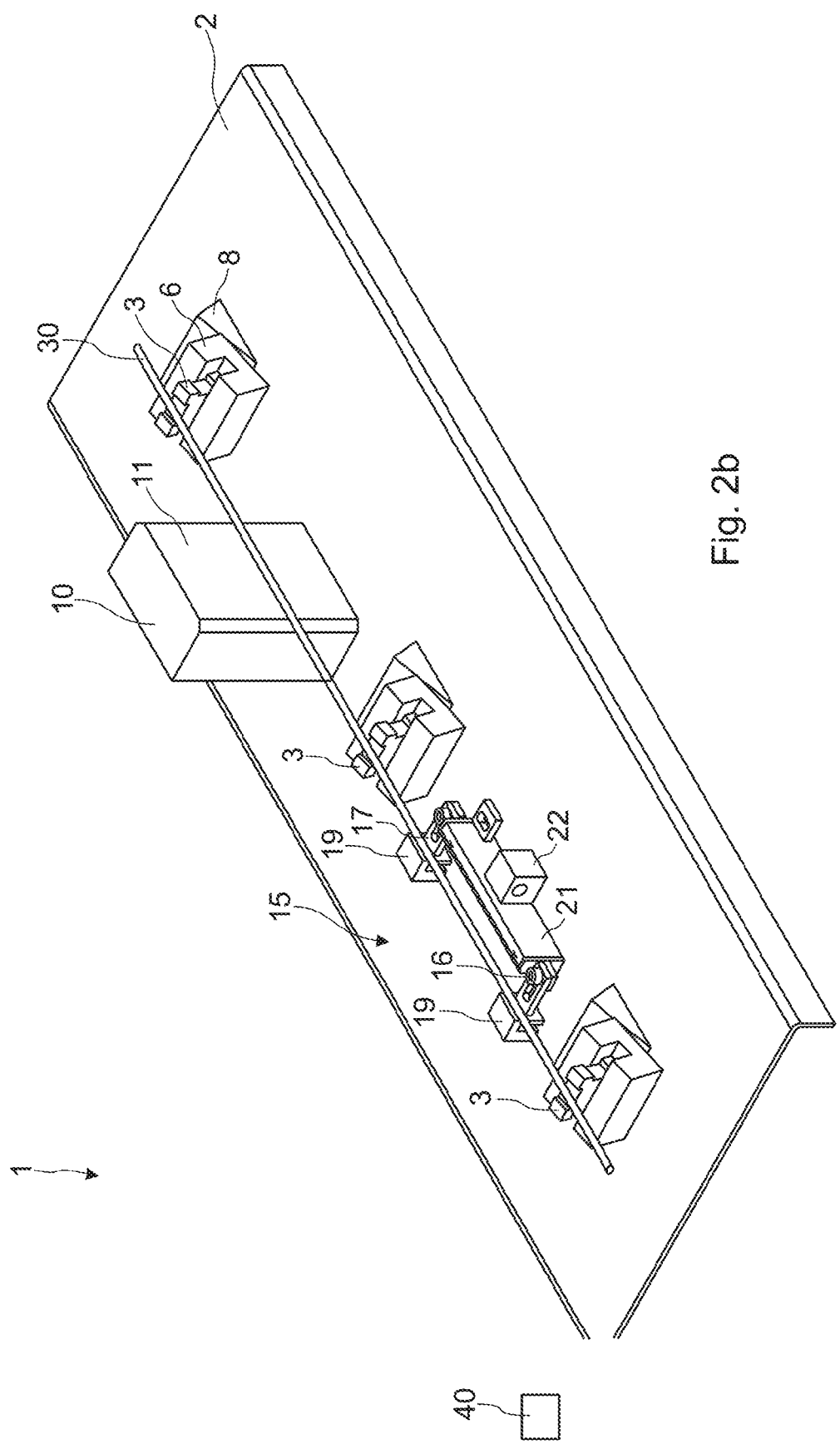

Initially a contact member 10 (or alternatively additional contact members not shown) projects substantially perpendicularly from the base plate 2, wherein according to FIG. 2b the rectangular front side 11 of the contact member 10 is aligned in parallel with the direction of movement of the glass tube strand or glass rod strand 30 and wherein the contact member 10 is positioned such that the glass tube strand or glass rod strand 30 directly abuts the front side 11 and that a lateral curvature (i.e. transverse to the direction of movement of the glass tube strand or glass rod strand 30 and in parallel with the plane of the base plate 2) can be reduced or minimized by a proper alignment of the contact member 10. As can be seen in the enlarged drawing according to FIG. 2d, the longitudinal edges of the contact member 10 are beveled. By means of a defined heat dissipation due to the slanted configuration of the longitudinal edges of the contact member 10 the curvature of the glass tube strand or glass rod strand 30 may be further improved. Series of experiments of the inventors have shown that one reason for this further enhancement of the curvature is not the mechanical alignment of the glass tube strand or glass rod strand 30 but the fact that according to the present invention the heat dissipation can be controlled and defined better and more precisely.

Figure 2E:
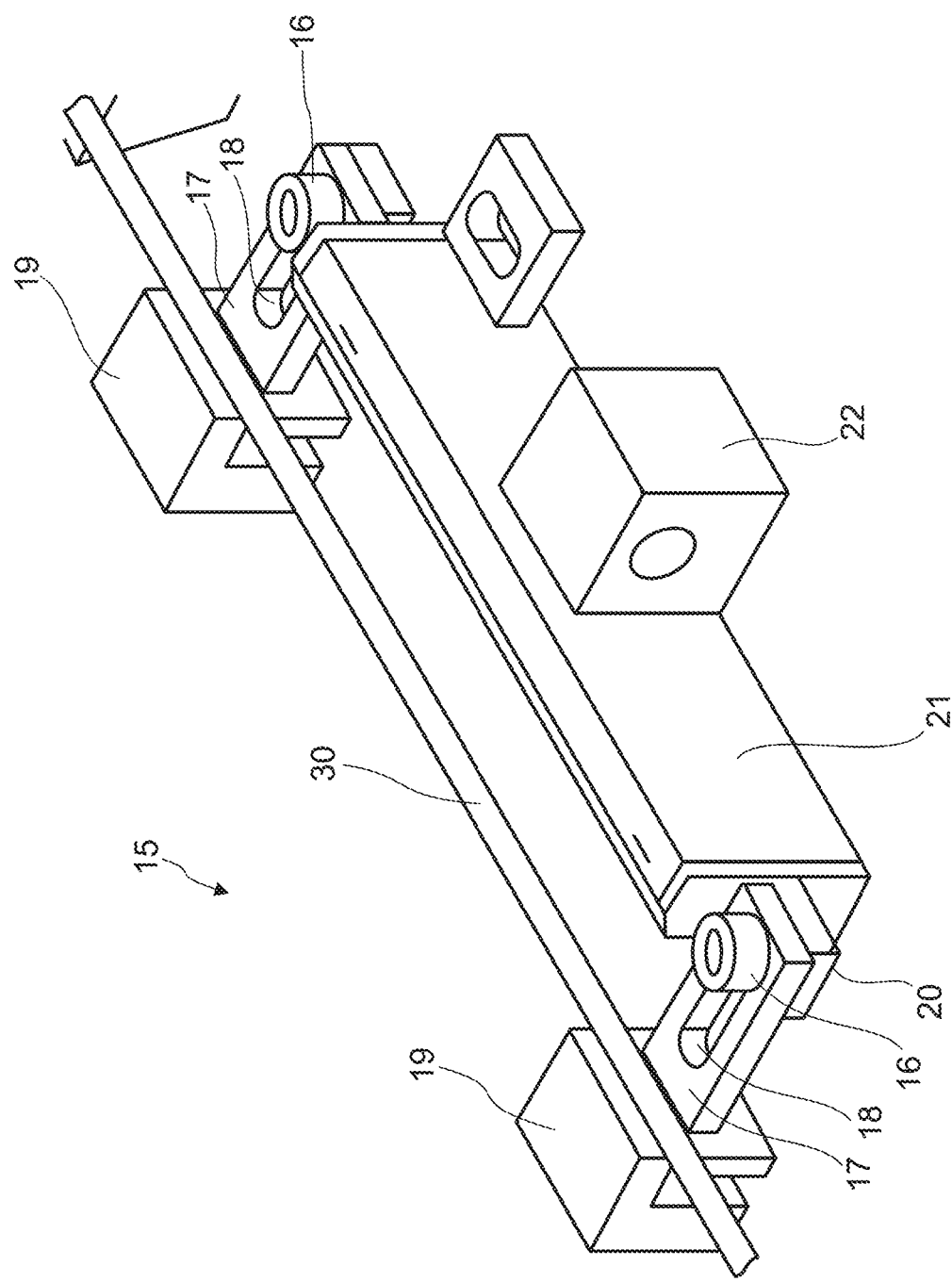

Furthermore, a selective local heating of the glass tube strand or glass rod strand 30 may be provided in the area designated by reference numeral 15, which is shown in FIG. 2e in an enlarged perspective view.

Referring to FIG. 2e, a gas burner 21, which is elongated in this exemplary embodiment and which has a relatively narrow and small orifice, is arranged below the glass tube strand or glass rod strand 30. The gas burner 16 is held in long slots 18 of holding plates 17 and can be moved and fixed in the long slots 18 appropriately to enable a precise positioning relative to the glass tube strand or glass rod strand 30. The holding plates 17 are respectively fixed to a holding block 19 which is in turn displaceably disposed on the base plate 2 and fixed by means of fastening members (not shown). The holding blocks 19 may also serve to accomplish directly the aforementioned positioning of the gas burner 21. To reduce unwanted ambient influences the gas burner 21 is shielded against the environment by a cover (not shown) or by a housing (e.g. by a box-shaped housing).

Because the gas burners 21 are disposed below the glass tube strand or glass rod strand 30, the heat losses on the bottom of the glass tube strand or glass rod strand 30 caused by the support on the support and guide members 3 are compensated for locally. For this purpose, unlike the prior art, no expensive heating around the entire circumference of the glass tube strand or glass rod strand 30 is required, which is otherwise difficult to accomplish in a controllable manner. In combination with the reduced heat dissipation according to the present invention due to the substantially punctiform support of the glass tube strand or glass rod strand 30 on the support and guide members 3 an undesired curvature of the glass tube strand or glass rod strand 30 can thus be further reduced or minimized.

The heating zone or each heating zone may be disposed before or after (downstream of) the respective contact member 10. Although only one lateral contact member 10 is shown in the drawings, in principle also a plurality of such contact members may be arranged in a corresponding manner. The heat treatment of the glass tube strand or glass rod strand 30 in the respective heating zone is preferably performed above the transition temperature of the particular type of glass of the glass tube strand or glass rod strand 30. Conveniently, the moving the glass tube strand or glass rod strand 30 has not cooled down to a temperature below the transition temperature of the particular type of glass before reaching the respective heating zone.

According to FIG. 2a, a measuring device 40 is disposed downstream on the drawing path 1, which measures the curvature of the glass tube strand or glass rod strand 30, in particular optically. The measurement can be carried out on the still moving glass tube strand or glass rod strand 30 or can be carried out on glass tubes or glass rods that have already been severed to predetermined lengths (and may even rest during the measurement) in a downstream handling station (for example, in a downstream storage or in a downstream packaging station). On the basis of the measured curvature of the glass tube strand or glass rod strand 30 positions and/or operating parameters of components of the apparatus 1 described above may be suitably varied and adjusted in order to reduce the curvature of the glass tube strand or glass rod strand 30 to a desired degree or even to minimize the curvature.

For this purpose also a central control device (not shown) may be provided, which controls suitably the positions and/or operating parameters of components of the apparatus 1 described above. The afore-mentioned position can be in particular the position of the respective support and guide members relative to the glass tube or glass rod strand or the position of the holding members, which respectively hold them, or the respective tilting of the respective support and guide members. The aforementioned operating parameters may be in particular the combustion quantity or the composition of the combustion gas of the at least one gas burner or the withdrawal speed for drawing the glass tube strand or glass rod strand.

As the glass tube strand or glass rod strand does not rotate about its longitudinal axis during its conveyance along the aforementioned drawing path, a continuous monitoring of the inner and outer diameter may thus be accomplished even for glass tube strands or glass rod strands having a cross-section which is different from a circular cross-section, in particular for glass tubes having an oval cross-section. Such a continuous monitoring of the inner and outer diameter may be accomplished for example by means of a non-contact measuring device especially an optical measuring device. The measurement values of such a measuring device can then be used for controlling or regulating a process such that, by means of the procedure described above for conveying, glass tube strands or glass rod strands having a cross-section, which is different from a circular cross-section, can be produced with higher precision. Furthermore, also other parameters may be monitored and measured for monitoring the characteristics of the glass tube strand or glass rod strand, e.g. the respective wall thickness at the two flat sides of a glass tube strand or glass rod strand or of a glass tube or glass rod, which has been severed to a predetermined length.

As will become apparent to a person skilled in the art upon reading the foregoing description any high temperature-resistant and abrasion-resistant materials are suitable for forming the support and guide members. Preferred materials are particularly graphite, e.g. carbon graphite FH42 of Schunk Kohlenstofftechnik GmbH. While in the case of a convention drawing path, as shown in FIGS. 1a-1e, supporting surfaces of a length of 30 cm were required, according to the present invention the supporting surfaces may be shortened to a length of less than 5 cm and or significantly less.

As will become apparent to a person skilled in the art upon reading the foregoing description, the features and members or groups of members described above may be combined in any suitable manner and any such combination should therefore be covered by the scope of the appended claims as well.

LIST OF REFERENCE NUMERALS 1 glass tube drawing path
2 base plate
3 support member
4 supporting surface
5 side walls
6 holding member
7 groove
8 wedge
9 inclined surface
10 contact member (made e.g. of carbon or graphite)
11 contact surface 12 slanted edge
15 heating zone
16 screw
17 holding plate
18 long slot
19 holding block
20 base
21 gas burner/heating device
22 holding block
30 glass tube
40 measuring device
100 Glass tube drawing path
101 glass tube
102 base plate
103 support block
104 V-shaped notch

What is claimed is:

1. A method for guiding a glass tube strand or glass rod strand along a direction of movement, the glass tube strand or glass rod strand having a cross-section that is different from a circular cross-section,
in which method the glass tube strand or glass rod strand is supported directly on and guided by a plurality of support and guide members that are arranged one after the other, if viewed in the direction of movement of the glass tube strand or glass rod strand,
wherein the plurality of support and guide members have planar, rectangular supporting surfaces of a predetermined length in the direction of movement,
wherein the plurality of support and guide members are disposed tilted in the direction of movement and that the glass tube strand or glass rod strand is directly supported on edges of the plurality of support and guide members to reduce a length of a contact zone between the plurality of support and guide members and the glass tube strand or glass rod strand in the direction of movement to a length smaller than the predetermined length.

2. The method according to claim 1, wherein the plurality of support and guide members are respectively held in a non-metallic insulating block.

3. The method according to claim 2, wherein the plurality of support and guide members are respectively clamped in a groove of the associated insulating block.

4. The method according to claim 1, further comprising adjusting a tilt angle about which the plurality of support and guide members are tilted in the direction of movement by at least one adjusting unit.

5. The method according to claim 4, wherein the respective adjusting unit comprises an adjusting wedge having an inclined surface on which the associated support and guide member or an insulating block, which holds said associated support and guide member, is directly supported, wherein the tilt angle is adjusted by displacing the associated support and guide member or the insulating block along the inclined surface.

6. The method according to claim 1, further comprising selectively heating the glass tube strand or glass rod strand locally in a heating zone that comprises at least one gas burner that heats the glass tube strand or glass rod strand substantially only from one side thereof.

7. The method according to claim 6, wherein the at least one gas burner is disposed below the glass tube strand or glass rod strand.

8. The method according to claim 1, further comprising measuring, via a measuring device, a curvature of the glass tube strand or glass rod strand and varying positions and/or operating parameters, via a central control unit, such that the curvature of the glass tube strand or glass rod strand is reduced or minimized.

9. The method according to claim 1, wherein the glass tube strand or glass rod strand has an oval cross-section.

10. The method according to claim 1, wherein the plurality of support and guide members are sufficient so that the glass tube strand or glass rod strand does not rotate about its longitudinal axis during conveyance in the direction of movement.

11. A method for guiding a glass tube strand or glass rod strand having a noncircular cross-section along a direction of movement, comprising:
providing a plurality of support and guide members each having a planar, rectangular supporting surface of a predetermined length in the direction of movement;
arranging the plurality of support and guide members one after another in the direction of movement;
tilting the plurality of support and guide members at a tilt angle in the direction of movement; and
supporting the glass tube strand or glass rod strand directly on the plurality of support and guide members, wherein the tilt angle is sufficient so that the glass tube strand or glass rod strand is supported on edges of the plurality of support and guide members to reduce a length of a contact zone between the plurality of support and guide members and the glass tube strand or glass rod strand in the direction of movement to a length smaller than the predetermined length.

12. The method according to claim 11, further comprising holding the plurality of support and guide members in a plurality of non-metallic insulating blocks, respectively.

13. The method according to claim 12, wherein the holding step comprises clamping the plurality of support and guide members in a groove of the plurality of non-metallic insulating blocks, respectively.

14. The method according to claim 11, further comprising controlling at least one adjusting unit to adjust the tilt angle.

15. The method according to claim 14, further comprising supporting the plurality of support and guide members on adjusting wedges having inclined surfaces, respectively, and, wherein the step of controlling the at least one adjusting unit comprises displacing the plurality of support and guide members and the adjusting wedges with respect to one another along the inclined surfaces.

16. The method according to claim 11, wherein the plurality of support and guide members are sufficient so that the glass tube strand or glass rod strand does not rotate about its longitudinal axis when conveyed in the direction of movement.

* * * * *